United States Patent
Berger et al.

(10) Patent No.: US 6,391,150 B1
(45) Date of Patent: May 21, 2002

(54) PROCESS FOR TREATING WASTE PAPER TO FORM A SPORE-FREE BASE TISSUE

(75) Inventors: Josef Berger; Friedrich Geishofer, both of Neusiedl (AT)

(73) Assignee: SCA Hygiene Products GmbH, Mannheim (DE)

( * ) Notice: Subject to any disclaimer, the term of this patent is extended or adjusted under 35 U.S.C. 154(b) by 0 days.

(21) Appl. No.: 09/486,812

(22) PCT Filed: Aug. 21, 1998

(86) PCT No.: PCT/EP98/05345

§ 371 Date: Mar. 2, 2000

§ 102(e) Date: Mar. 2, 2000

(87) PCT Pub. No.: WO98/16959

PCT Pub. Date: Apr. 8, 1999

(30) Foreign Application Priority Data

Sep. 26, 1997 (DE) .......................... 197 42 729

(51) Int. Cl.⁷ ................................ D21B 1/32
(52) U.S. Cl. ................................ 162/4; 162/8
(58) Field of Search ............... 162/4, 5, 6, 161

(56) References Cited

U.S. PATENT DOCUMENTS 5,900,111 A * 5/1999 Nystrom et al. ............... 162/6

FOREIGN PATENT DOCUMENTS

| DE | 2240726 |   | 2/1974 |
|---|---|---|---|
| DE | 2607703 |   | 12/1976 |
| DE | 2214786 |   | 3/1981 |
| DE | 3001862 |   | 7/1981 |
| DE | 4318431 | * | 10/1993 |
| DE | 3741583 |   | 11/1996 |

(List continued on next page.)

OTHER PUBLICATIONS

"Hygieniche Aspekte des Einsatzes verschiedener Altpapier-qualitäten", Höötmann, U., Müchen: Papiertechnische Stiftung PTS, 1995, 170 Seiten, PTS–Manuskript PTS–MS 19/95, pp. V, 11–1 to 11–5.

"Fibre recycling as a way of life in Austria", Paper, Jun. 10, 1985, pp. 23, 24, 26, 29.

(List continued on next page.)

*Primary Examiner*—Dean T. Nguyen
(74) *Attorney, Agent, or Firm*—Burns, Doane, Swecker & Mathis, L.L.P.

(57) ABSTRACT

The disclosure relates to a process for the treatment of old paper without the use of biocides and chlorine compounds as well as with the virtual avoidance of hydrogen peroxide and/or peracetic acid with a total germ count of less than 1000 CFU/g and/or a surface germ count of less than 20 CFU/dm², comprising the following process steps: a treatment of the pre-sorted, optionally pre-shredded, old-paper starting material in an environment containing water in order to activate the microorganism spores, a germination of the spores, a further processing of the old-paper starting material containing germinated spores, preferably in at least one separation stage in a generally known manner at temperatures above room temperature (20° C. to 70° C. [68° F. to 158° F.]), optionally comprising pre-sorting, flotation, fine-sorting, washing and deckering, while returning the separated and de-pulped clear water, all the way to the dissolving stage, followed by hot dispersion of the further processed paper starting material in a water vapor atmosphere at atmospheric overpressure, temperature-controlled treatment and processing in a generally known manner into a largely spore-free recycled pulp, from that into a largely spore-free recycled base tissue and from that into a tissue product suited for final consumption; it also relates to the recycled base tissue or tissue product thus obtained and to a device for the execution of the process.

22 Claims, 4 Drawing Sheets

FOREIGN PATENT DOCUMENTS

| | | |
|---|---|---|
| EP | 0 394 734 | 10/1990 |
| EP | 0 514 864 | 11/1992 |
| EP | 568404 * | 3/1993 |
| EP | 0 557 651 | 9/1993 |
| EP | 0 568 404 | 11/1993 |
| EP | 0 653 510 | 5/1995 |
| WO | 92/18638 | 10/1992 |

OTHER PUBLICATIONS

"Möglichkeiten der Verwendung von Faserstoff aus Hausmüll bei der Papier—und Kartonherstellung", Stark, H., Berlin, pp. 1267–1274.

"The New JMC's Process: Higher Stickies Removal and Better Decontaminant Together with Optimized Bleaching", Clément, J.M., et al., Papermakers Conference, 1993, pp. 7–12.

"Current status of paper reprocessing effluent characteristics and disposal practices", Gove, George W. and McKeown, James J., Tappi, Nov. 1975, vol. 85, No. 11, pp. 121–126.

"Microbial contamination in the use of starch", Poock, Steven J., Tappi Journal, Aug. 1985, pp. 78–80.

"Das Cell'link–Konzept zur Optimierung des Chemikalieneinsatzes im Deinking–Prozeβ", Salzburger, W., et al., Wochenblatt Für Papierfabrikation 13, 1996, pp. 592–579.

"Research into the Hygienic Qualities of Paper Recovered by Mechanical Sorting of Municipal Waste", Kinderler, Hubert W., et al., W. Germany, Recycling World Congress 1, Basel, 1978, Paper 2/4/i–2/4/v and flowchart.

* cited by examiner

PROCESS FOR TREATING WASTE PAPER TO FORM A SPORE-FREE BASE TISSUE

BACKGROUND OF THE INVENTION

The invention relates to a process for the treatment of waste paper, sometimes referred to herein as with the exclusion of biocides and the total exclusion of chlorine compounds as well as with the virtual avoidance of hydrogen peroxide and/or peracetic acid, which also yields a recycled base tissue and optionally, to a tissue product that is suited for final consumption and that has a total germ count of less than 1000 CFU/g (colony-forming units per gram); the invention also relates to a device to carry out this process as well as to recycled base tissue paper and optionally, a tissue product that is suited for final consumption and that has a surface germ count of less than 20 $CFU/dm^2$ and a total germ count of less than 1000 CFU/g as a product. The above-mentioned germ counts are determined in a manner similar to DIN 54378 (surface germ count) and in a manner similar to DIN 54379 (total germ count).

The expression "with the exclusion of biocides," which is used in conjunction with the process according to the invention, refers to biocide quantities that are present in small quantities, preferably in quantities of less than 0.01% by weight relative to the recycled base tissue or to the tissue product that is suited for final consumption.

Moreover, in this context, it should also be pointed out that the clear water that is used within the scope of the process according to the invention (for example, as a temperature-control medium in the papermaking machine, as shown in FIG. 1) is circulated and purified by means of a circulating-water treatment system (Sedifloat); right from the start, this water only has concentrations of biocide substances that lie below the detection limit of less than 0.1 ppm, since its HPLC analysis was negative. The DCM extract that was examined did not reveal any biocide either. As is known, in the above-mentioned circulating-water treatment system, the fine substances and fillers are separated almost quantitatively from the water and thus the treated water is used again for dilution purposes.

The article in the PTS Manuscript Volume 19/95, titled Microbiocides in Papermaking, Hygienic Aspects of the Use of Various Grades of Old Paper, by U. Höötmann, gives a general overview as to which starting materials, for example, a fiber raw material recovered from mixed household garbage, from mixed old paper, from industrial waste or mixed old paper or from raw material obtained from collections within the scope of Germany's Dual System can be used for waste paper processes. This general overview, however, does not provide any information that could anticipate the process according to the invention as claimed.

German Patent No. 26 07 703 relates to a process for the production of sanitized recycled paper made of waste containing paper, whereby a fraction—consisting essentially of paper fragments or a mixture of paper and plastic fragments which are retained by a screen having a mesh size of at least 20 mm—is separated from the waste in a generally known manner and is then subjected to a brief thermal treatment, whereby the fragments are heated to a temperature ranging from about 100° C. to 130° C. [212° F. to 266° F.], whereupon the fragments, optionally after separation of the plastic fraction, are compacted while a temperature of at least 100° C. [212° F.] is maintained, and the compacted fragments are kept at a temperature of about 100° C. to 110° C. [212° F. to 230° F.] for at least 24 hours at the appertaining temperature limit. The heat treatment is carried out by means of IR heat, that is to say, dry heat. This process is based on the objective of producing recycled paper that, in contrast to conventional processes, is no longer laden with a bacteria content in the order of magnitude of $10^9$ heterotrophic colony-forming bacteria per gram of product and with an unknown amount of mold and mildew as well as with thermophilic organisms that not only pose a threat to the health of the operating personnel but that also lead to annoying odor and slime problems in the return water system of the papermaking machines. According to this process, the bacteria content is reduced to about $10^2$ bacteria per gram of weighed-in material.

However, this state of the art does not suggest the subject matter of the present invention as claimed, that is to say, working in a medium containing water or in moist heat, nor does it give any indication that, by means of this process, the spores of the bacteria or fungi are to be activated before the germination.

European Preliminary Published Application No. 0,514,864 relates to a process for the treatment of secondary pulp comprising cellulose fibers and tacky contaminants that is made of old paper, whereby the pulp is brought into contact with a gas containing oxygen without added alkali under such conditions in terms of temperature and oxygen partial pressure and for such a period of time that the stickiness of the tacky contaminants is diminished, thus reducing problems involving operating conditions and relating to the product quality during the further processing of the cellulose fibers into the recycled paper product. This contacting procedure is preferably carried out at a temperature between 60° C. and 130° C. [140° F and 266° F.] at an oxygen partial pressure ranging from 34.5 to 3,100 kPa.

The outcome of this process is, on the one hand, a product with a low percentage of old paper that already has a suitable strength for special application purposes and, on the other hand, a product with a high proportion of recycled paper that can be used, for example, for newspapers, diapers, tissues, writing paper and printing paper. This state of the art is based on the objective of providing a treatment process of the type mentioned above for secondary pulps. This state of the art, however, makes no mention of the production of a recycled paper that is produced so as to be essentially free of biocides and that, as a result of this process, has a surface germ count of less than 20 $CFU/dm^2$.

European Patent Specification No. 0,394,734 relates to a process for the sterilization of objects, preferably packaging material, using a gaseous sterilization means. However, this publication does snot give any indication of parallels to the treatment process according to the invention which functions without the use of biocides and which leads to a low bacterial load in the product of the process.

German Patent No. 3,001,862 relates to a process for the production of raw material for paper production using old paper, whereby old paper from trash is already treated with a disinfectant gaseous means when it is sorted out from the trash and only subsequently is the old paper treated, especially by means of dissolution and defiberization, for purposes of paper production. Ozone or chlorine are preferably used as the disinfectant or biocide. This neither anticipates nor suggests the process according to the invention, since this process of the state of the art—in contrast to the process according to the invention—is a dry process that makes use of disinfectants.

German Preliminary Published Application No. 2,214,786 relates to a process for the destruction of files and spent packaging tubes made of paper or paperboard, whereby the material to be disintegrated is first mechanically shredded and the shredded product is then compacted for purposes of volume reduction, whereby the shredded product is moistened before the compacting step. Preferably, ink-degrading as well as bactericidal substances and optionally binders are added to the water. Another subject matter of this state of the art is a suitable device to carry out the above-mentioned process. This state of the art is based on the objective of creating a process and a device of the above-mentioned type with which the shredded material can be compacted very tightly and also kept in this compacted form so that further treatment is facilitated. This does not suggest the process according to the invention whose objective is rather to provide a process for the preparation of old paper without the use of biocides so as to manufacture paper that is largely free of spore-forming microorganisms and that has a low total germ count.

U.S. Pat. No. 5,324,432 relates to a process to inhibit filamentous growing bacteria in water streams from industrial processes, whereby a protease enzyme is added to the water streams together with a biocide in such a quantity that the components interact to kill the bacteria. Process water types used in the pulp and paper mill industry are preferably used as the process water. This state of the art is based on the objective of lowering the bacterial load in industrial process water streams by adding a biocide as well as an enzyme. In particular, this makes it possible to markedly reduce the bacterium Sphaerotilus natans. However, this state of the art does not suggest the subject matter of the present invention as claimed, namely, the creation of a treatment process for old paper without the use of biocides that yields a process product with a very low germ count.

World Patent No. 92/18638 relates to a process for the hydrolysis of water-insoluble esters in the presence of a special lipase, whereby they are converted at an acidic pH value in the presence of an aluminum salt. Preferably, the above-mentioned ester hydrolysis process is used during a pulping or papermaking process. This state of the art is based on the objective of increasing the hydrolysis rate of esters in the presence of lipases by adding chemicals. This does not suggest the subject matter of the present invention as claimed, namely, the creation of a treatment process for old paper that yields a process product with a very low germ count.

German Patent No. 3,741,583 relates to a process to destroy microbes that cause precipitates, form slime and/or impair the quality of food-grade paper or paperboard, said process being used in the production water of papermaking plants, whereby a lytic enzyme with glucanase and protease activity that destroys the microbe cell walls is added to the production water in the papermaking plant. Using this process and the enzyme preparation, the growth of Aspergillus niger—a mold that is commonly found in the paper industry—is reduced, and so is the growth of Bacillus subtilis and yeast sp.1696. This, however, neither anticipates nor suggests the process according to the invention, since this state of the art describes a completely different objective.

The publication by T. Yoda, M. Tsutoma and M. Osamu, Production of Paper Fibers from Community Waste, in the Conference Report titled "Recycling", Berlin 1979, pages 1299 to 1304, relates to a process to recover paper fibers by means of a wet process to treat the product, which is contaminated with Coli bacteria in the order of magnitude of $10^6$ germs per gram of material; by using hypochlorites, the number of these Coli bacteria can be reduced to $10^3$ germs per gram of material. The material obtained from the sterilization and simultaneous bleaching with hypochlorite is made of initial materials such as newspaper and magazine paper, corrugated cardboard and writing paper or white paperboard, and it can be further processed into a fibrous material that could be used for the middle and bottom layers of white paperboard and corrugated cardboard together with other fibers; conceivably, this fibrous material could also be used for writing paper and toilet paper of a lesser grade. However, this process neither anticipates nor suggests how to arrive at the process according to the invention in question.

The article in the journal Paper, dated Jun. 10, 1985, no. 10, vol. 203, pages 23 to 29, describes a processing of fibers at a number of Austrian and German companies in the paper industry. As representative examples, a description is given of recycling at the Austrian company Neupack by means of a thermal treatment of the old-paper starting material at 90° C. [194° F.] as well as at the German company FS Karton with a steam treatment unit at a temperature of 140° C. [284° F.] that kills all bacteria, although no mention is made of bacterial spores. Aside from this isolated information, the state of the art does not give any information that would suggest the process according to the invention. In particular, it is not stated that the temperature increase is used specifically to induce spore germination, as is done in the process according to the invention.

The monograph titled "Possibilities for the use of fiber material from household garbage in paper and paperboard manufacture" by H. Stark, Vol. 2, Berlin, Germany, pages 1145 to 1152, relates to laboratory experiments as well as to a large-scale study with old paper from trash for the production of a low-grade, coated gray paperboard with a substance of 350 g/m$^2$. Within the scope of this process, after the material has been deckered to 30%, it is dispersed at about 95° C. [203° F.], as a result of which it has been shown that the germ count is reduced by more than 99%; thus, the finished paperboard only contains germs in the order of magnitude of between 160 and 85 germs per gram of paperboard. These general statements, which did not include the production of tissue paper, do not suggest the process according to the invention since in the latter process, substantially lower germ counts are obtained without using an additional biocide.

The publication titled "Research into the hygienic qualities of paper recovered by mechanical sorting of municipal waste" by H. W. Kindler, published in Recycling World Congress 1, Basel, Switzerland, 1978, Paper 2/4, relates to a treatment process of the Escher Wyss company in which paper fibers from an old-paper starting material are used for recycling. The process of fiber production consists of the steps of dissolving old-paper particles in a pulper, adding fresh water and a screen press effluent, followed by a treatment—for example, in an intermediate tank—in a cleaning device, a defiberizer, a central cleaning unit, a vibration frame and the dewatering on a double mesh net, heating the crumbly material up to 90° C. [194° F.], using steam at a temperature of 162° C. [323.6° F.] a heating spiral in order to plasticize the dirt particles and reduce the bacteria fraction, followed by a screening of the fibers in a disperser and a discharge of the material to a papermaking plant at 45° C. [113° F.]. However, this sequence of steps neither anticipates nor suggests the process according to the invention, in particular, no indication is given as to whether the bacteria fraction, and especially the fraction of microorganisms capable of spore formation, can be reduced to germ counts of less than 100 colony-forming units per gram of product.

An article by J. M. Clément in the 1993 yearbook of the Papermakers Conference describes the new JMC process, which makes use of a decontamination procedure to remove contaminants such as glues and hot melts. However, this article does not state that no biocides are used during the treatment of the old paper or that, at the same time, a product with only a low germ count is obtained.

The article by G. W. Gove and J. J. McKeown in Tappi, the issue of November 1975, Vol. 58, page 121 gives an overview of disposal practices in old-paper processing. However, this general article does not indicate what approach would be taken within the scope of processing old paper in order to obtain a process product that is largely free of sporeforming microorganisms without the use of biocides.

The article by S. J. Poock in Tappi Journal, August 1985, page 78 ff. relates to microbial contamination when starch is used during paper manufacture. In this context, special mention should be made of the fact that biocides should be used in this case. Thus, this state of the art neither anticipates nor suggests not using any biocides while nevertheless obtaining a process product that is extremely low in germs within the scope of a process for the treatment of old paper.

The article by W. Salzburger et al. titled "The Cell'link concept for optimizing the use of chemicals in the deinking process", published in the Weekly for Paper Manufacture, Vol. 13, 1996, page 592 ff., describes a new process that achieves an optimal utilization of the deinking chemicals peroxide, sodium hydroxide solution and water glass. This translates into a targeted savings on chemical that has an influence on the degree of whiteness and the residual peroxide content of the deinked recycled material. This, however, neither anticipates nor suggests using biocides, chlorine compounds, hydrogen peroxide and/or peracetic acid in order to obtain a largely germ-free process product within the scope of a process for the treatment of old paper.

In addition to the usual vegetative forms of life of microorganisms, the old-paper starting product contains spores (permanent forms) of sporulating microorganisms.

SUMMARY OF THE INVENTION

The present invention is based on the objective of providing a treatment of old paper without the use of biocides and chlorine compounds as well as with the virtual avoidance of hydrogen peroxide and/or peracetic acid, whereby the paper is largely free of sporeforming microorganisms. In addition to shredding and cleaning, the old-paper treatment according to the invention also encompasses a minimization of the microbial contamination of the old paper used.

SUMMARY

Accordingly, the present invention provides a process for the treatment of waste paper containing spores of sporulating microorganisms, without the use of biocides and chlorine compounds as well as with the virtual avoidance of hydrogen peroxide and peracetic acid, including the following process steps: treating the waste paper starting material in an environment containing water in order to activate the microorganism spores, germinating the spores, further processing the material in at least one separation stage at temperatures above room temperature, hot dispersing the further processed material in a water vapor atmosphere at a pressure greater than atmospheric pressure, subjecting the dispersed material to a temperature-controlled treatment and processing into a largely spore-free recycled pulp, and from that into a largely spore free base tissue with a total germ count of less than 1000 CFU/g and a surface germ count of less than 20 CFU/dm$^2$.

Thus, the present invention relates to a process for the treatment of old paper without the use of biocides and chlorine compounds and—with the virtual avoidance of hydrogen peroxide and/or peracetic acid—for the production of a recycled base tissue with a total germ count that is lower than 1000 CFU/g and a surface germ count of less than 20 CFU/dm$^2$, comprising the following process steps:

the treatment of the pre-sorted and/or unsorted, optionally pre-shredded, old-paper starting material in an environment containing water in order to activate the micro-organism spores, the induction of germination of the spores, the germination of the spores, the further processing of the old-paper starting material containing germinated spores, preferably in at least one sorting stage in a generally known manner at temperatures between 20° C. and 70° C. [68° F. and 158° F.], optionally comprising pre-sorting, flotation, fine sorting, washing and deckering while returning the separated and de-pulped clear water, all the way to the dissolving stage, followed by a dispersion (hot treatment) of the paper starting material to be further processed in a water vapor atmosphere at atmospheric overpressure, a subsequent temperature-controlled treatment and a subsequent substance dilution using papermaking machine return water and processing in a generally known manner into a virtually spore-free recycled pulp and from this, into a virtually spore-free recycled base tissue or a tissue product that is suited for final consumption. The above-mentioned temperature-controlled treatment should generally take at least 120 minutes.

According to a preferred embodiment of the treatment process according to the invention, a thermal treatment, a treatment by means of ultrasound, a treatment by means of ultraviolet light or a suitable enzymatic or chemical treatment serves as the spore-activating treatment.

In another preferred embodiment of the process according to the invention, an old-paper starting material dispersed in water is used as the environment containing water for the old-paper starting material.

In another preferred embodiment, the residual moisture of the old-paper starting material is 5% to 15% by weight, preferably 7% to 13% by weight, and especially 9% to 10% by weight. The term residual moisture as defined by the invention is the percentage of water present in the old-paper starting material.

Moreover, commonly employed auxiliaries and additives such as up to 2% by weight of sodium hydroxide, up to 3% by weight of water glass, deinking auxiliaries such as soaps, enzymes or surfactants in amounts of up to 2% by weight as well as commonly employed complexing agents in amounts of up to 2% by weight, each relative to the air-dry starting material, can be added to this old-paper starting material that is dispersed in water. "Air-dry starting material" definition: see DIN 6730 1996-05.

In another preferred embodiment, the subsequent germination of the spores takes place over a period of 60 to 120 minutes, preferably 70 to 100 minutes, at temperatures of 20° C. to 70° C. [68° F. to 158° F.], preferably 30° C. to 60° C. [86° F. to 1400F]. Here the pulp consistency is 1% to 10% by weight, preferably 3% to 5% by weight.

According to another preferred embodiment of the treatment process according to the invention, the subsequent dispersion is carried out in a water vapor atmosphere above atmospheric pressure, preferably at a pressure of 0.1 to 4 bar, especially 1.2 to 1.6 bar. Here, the pulp consistency is 15% to 50% by weight, preferably 25% to 35% by weight.

According to another preferred embodiment, the dispersion is carried out at temperatures of 100° C. to 140° C. [212° F. to 284° F.], preferably at 110° C. to 130° C. [230° F. to 266° F.], especially at about 121° C. [249.8° F.], for a period of time that is sufficient to kill off the germinated microorganisms in the mixture.

According to another preferred embodiment of the treatment process according to the invention for old paper, subsequent to the dispersion, a thermal (temperature-controlled) treatment is carried out for a period of time of at least 120 to 240 minutes, preferably 150 to 180 minutes. Here the pulp consistency is 5% to 16% by weight, preferably 10% to 14% by weight. With this thermal treatment, the temperatures normally used are about 50° C. to 90° C. [122° F. to 194° F.], preferably 60° C. to 85° C. [140° F. to 185° F.], and especially 70° C. to 80° C. [158° F. to 176° F.].

The above-mentioned sporulating microorganisms are preferably spores of algae, fungi and/or bacteria which differ from the usual vegetative life forms of microorganisms in that they form endospores. The frequently occurring vegetative cells are normally Pseudomonas of various species; these are usually present in the old-paper starting material in an amount of $10^5$ to $10^7$ CFU/g. Moreover, species of bacillus are commonly found in old-paper starting materials, and they are present in bacterial counts between $10^3$ and $10^4$ CFU/g. The total bacterial count is, of course, higher by several powers of ten. Due to the formation of highly heat-resistant spores, these bacteria survive the passage through the dry segment of the process according to the state of the art, for example, through a tissue or papermaking machine. Furthermore, mold spores are also found in old-paper starting materials, although they only add to the microbiological load if the production takes place in a neutral or slightly acidic pH range. In addition, yeast with germ counts between $10^4$ and $10^8$ CFU/g are found in individual cases, and finally, there are also anaerobic microorganisms such as sulfate reducers in some systems. Last but not least, in some cases, it is also possible for anaerobic spore-forming bacteria such as, for example, Clostridia, to grow in anaerobic zones.

According to another preferred embodiment, the old-paper starting material used has already been pre-sorted according to the individual components and selected from low-grade, medium-grade or high-grade paper as well as kraft paper as defined in European Standard EN 643.

Low-grade paper, as defined in the above-mentioned standard and as can be used according to the invention, refers to originally mixed old paper, mixed old paper and cardboard (unsorted), sorted mixed old paper and cardboard, paperboard cuttings, retail store old paper, corrugated cardboard, corrugated cardboard chips (new), illustrated magazines, illustrated brochures without glued spines, newspapers and brochures (mixed), newspapers and brochures without glued spines (mixed), brochures and magazines (mixed) as well as shredded office paper (mixed).

Medium-grade paper, as defined in the above-mentioned standard and as can be used according to the invention, refers to old newspapers, magazines, over-issues, sections of multi-layer paperboard with a white layer, chips in mixed colors, magazine chips, magazine chips (free of glued spines), colored folders, books without covers (wood-free), books, heavy stock, white carbonless paper, colored carbonless paper, bleached coated polyethylene paperboard, polyethylene-coated paperboard as well as office paper containing wood throughout.

High-grade paper, as defined in the above-mentioned standard and as can be used according to the invention, refers to pastel mixed printed chips, bright colored mixed printed chips (wood-free), printed cards (mixed colors), non-compacted printed wood-free white office paper, punch cards (chamois colored), white files (mixed), white files (wood-free), white continuous-feed forms (wood-free), white continuous-feed forms (wood-free, non-dyeing), white multi-layer paperboard with imprint, white multi-layer paperboard (not printed), white newsprint, white magazine printing paper, coated paper (white, containing wood), coated paper (white, wood-free), white chips containing wood, white chips (mixed) white chips (wood-free) as well as white chips (wood-free, not coated).

Kraft paper, as defined in the above-mentioned standard and as can be used according to the invention, refers to brown corrugated cardboard, kraft corrugated cardboard II, kraft corrugated cardboard I, kraft paper bags (used), kraft paper bags (used, clean), kraft paper (used) as well as kraft paper (new). Any mixtures of the above-mentioned components of each group can be used according to the invention.

According to another preferred embodiment, the processing of the old-paper starting material passes through the intermediate stage of a largely spore-free recycled pulp to the largely spore-free recycled base tissue in a generally known manner, and then, likewise in a generally known manner through a further process, for example, that yields the corresponding tissue paper products, preferably in the form of single-layer or multi-layer folded products and/or rolled products, for example, toilet paper, kitchen paper towels, napkins, paper tissues, cosmetic wipes, paper towels, cleaning wipes and cloths.

Another subject matter of the present invention is a device to carry out the above-mentioned treatment process for old paper, comprising essentially a dissolving aggregate, optionally a vat or a dump chest, other commonly employed sorting stages in the form of a pre-sorting unit, a flotation unit, a fine-sorting unit, a washing unit as well as a deckering device, followed by a pressure dispersion device (hot-treatment stage), temperature-control device and further processing devices such as, for example, holding basins or towers and drying units to form the recycled pulp or recycled fibrous material in flat or bale form.

Moreover, there can also be machines for additional material cleaning and bleaching in the old-paper treatment installation. The order in which these machines are set up and operated can vary, depending on the required material and quality properties.

Another subject matter of the present invention is a tissue paper product in the form of base tissue paper or as a ready-to-use tissue product that is suitable for consumption, with a total germ count of less than 1000 CFU/g and a surface germ count of less than 20 CFU/dm$^2$, which can be obtained by means of the processes described above.

This is done in a generally known manner in that the recycled pulps are fed, for example, either directly to an installation for base tissue paper production or else are dewatered, stored temporarily in flat or bale form, for example, by drying to a 10% residual moisture content and subsequently conveyed to a base tissue paper production installation consisting of a so-called constant section and the actual base tissue production machine, for example, a conventional "Yankee machine" or a TAD (Through Air Drying) tissue machine.

In a hygiene paper processing unit located downstream from the base tissue production, a tissue product that is suited for the above-mentioned final use is then manufactured in that one or more single-layer or multi-layer feed roll(s) of the base tissue paper is/are processed on either automatic folding or roller machines to make the tissue final product. It goes without saying that no auxiliaries that would increase the germ counts in the finished tissue product are used within the scope of the further processing. Special attention should be paid to this when glue, lotions or other components are used that could conceivably be susceptible to microbial contamination.

Biocide as defined in the present invention refers to commonly employed environmental chemicals, especially environmental chemicals used in the paper industry, that are utilized to control harmful, minute organisms, especially microorganisms. The primary effect of many biocides is selective for individual groups of microorganisms, but often such biocides such as, for example, DDT—which belongs to the organic chlorine compounds—can also accumulate via the food chain in other species that do not belong to the actual target groups, thus posing a chronic or acute risk to other groups of a community of living creatures. Biocides typically used in the paper industry are, for example, sodium chloride, sodium peroxide, sodium hydrogen sulfite, 1,4-bis-(bromoacetoxy)butene, tetramethylthiuram disulfide, 3,5-dimethyl-tetrahydro-1,3,5-thiadiazine-2-thione, bromohydroxyacetophenone, disodium cyanodithioimido carbonate, potassium-N-methyldithio carbamate, N-(2-p-chlorobenzoylethyl)-hexaminium chloride, methylene bis-thiocyanate, potassium-N-hydroxymethyl-N'-methyl dithiocarbamate, sodium-2-mercaptobenzo-thiazole, sodium hexafluorosilicate, 2-oxo-2-(4-hydroxy-phenyl)-acetohydroxim acid chloride, N-[α-(1-nitroethyl)benzyl]-ethylene diamine, 2-bromo-2-nitropropanediol-(1,3), aqueous solution of p-hydroxybenzoic acid ester (methyl-, ethyl- and n-propylester of p-hydroxybenzoic acid as well as its sodium salts) in hydrogen peroxide (35% by weight), mixtures of 5-chloro-2-methyl-4-isothiazolinon-3-one and 2-methyl-4-isothiazoline, mixtures of tris-(hydroxymethyl)-nitromethane from 5-chloro-2-methyl-4-isothiazolinon-3-one and 2-methyl-4-isothiazoline, a mixture of N,N'-dihydroxymethylene urea and 1,6-dihydroxy-2,5-dioxahexane and 5-chloro-2-methyl-4-isothiazolinon-3-one and 2-methyl-4-isothiazo-linon-3-one, 2,2-dibromo-3-nitrilopropionamide, a mixture of phenyl-(2-chloro-2-cyanovinyl)-sulfone and phenyl-(1,2-dichloro-2-cyanovinyl)-sulfone and 2-phenyl-sulfonylpropionitrile, 1,2-benzisothiazoline-3-one and mixtures of the preceding products, sorbic acid, p-hydroxybenzoic acid ethyl- and/or -propylester, formic acid, benzoic acid, adduct from 70% benzyl alcohol and 30% formaldehyde.

The term chlorine compounds refers to inorganic as well as organic chemicals that either contain chlorine or else split off chlorine and that are commonly employed especially in the paper industry. These are, for instance, alkali hypochloride, earth alkali hypochloride, chlorine and chlorine dioxide.

The present invention is explained in greater detail below with reference to embodiments in the form of drawings.

BRIEF DESCRIPTION OF THE DRAWINGS

FIG. 1 shows a detailed old-paper starting material process according to the invention.

DETAILED DESCRIPTION OF PREFERRED EMBODIMENTS

In a typical process sequence of the treatment process according to the invention as shown in FIG. 1, first of all, the pre-sorted old-paper starting product 1 is fed into a dissolving and sorting drum 2, for example, an Ahlström drum, and treated there together with a flotation agent, optionally in the presence of a base, such as sodium hydroxide, for a period of time of about 10 to 60 minutes, preferably 20 to 25 minutes, at temperatures of 20° C. to 70° C. [68° F. to 158° F.], preferably 45° C. to 60° C. [113° F. to 140° F.].

Then the product treated in this manner is transferred to a vat 3 that can have typical pulp residence times of, for example, 20 to 60 minutes at temperatures of 20° C. to 70° C. [68° F. to 158° F.], preferably 30° C. to 50° C. [86° F. to 122° F.].

This is followed by a cleaning stage by means of centricleaners, for example, in a thick stock cleaner 4, in which particles that are specifically heavier than the fibers, for instance, paper clips and staples, are separated out.

The further processing according to the invention as a result of the pretreatment of the paper starting material containing germinated spores is preferably carried out as follows:

After the centricleaners 4, the starting product enters a perforated sorting device 5 where unwanted components are separated out through perforated or slotted metal plates. Then the product is transferred to a vat, for example, a deflaking vat 6, which serves as the tank. Subsequently, the starting product is optionally fed through a deflaker 7 where any fiber bundles are dissolved and printing inks and coating chips, etc., are ground up. Then comes the flotation in the flotation apparatus 8, here printing ink flotation, for a period of 6 minutes at a temperature of 45° C. [113° F.]. Afterwards the starting product goes into a vat, for example, a flotation pulp vat 9, with a residence time of 2 to 4 minutes and it is then further treated for a time of 1 to 2 minutes at a temperature of 40° C. to 45° C. [104° F. to 113° F.] in a cleaner 10. This is followed by further separation in a slotted sorting device 11 at a residence time of 1 to 2 minutes. Then the starting product is taken to a combined washing 12 and deckering stage 13+14 consisting of either a washing device 12, for example, a disk save-all, or of the Variosplit, whereby the usual residence time is 1 to 5 minutes.

Subsequent to these treatment steps that can be used as an alternative, the product is transferred to a standpipe 13 with a deckering pump—in this case, a middle consistency pump (MC pump). This conveys the starting product into a screen belt press 14, whereby this treatment takes from 3 to 5 minutes.

Then comes the pressure treatment with a residence time of 2 to 8 minutes, whereby the temperature is raised to 110° C. to 130° C. [230° F. to 266° F.]. In the heating spiral and subsequent dispersion device 15, this pressure treatment is carried out at 0.75 to 1.8 bar during the time that the pulp needs to pass from the inlet of the heating spiral to the outlet of the standpipe 16 after the pressure dispersion 15. The pulp consistency in the heating spiral and in the disperser is 15% to 50% by weight, preferably 25% to 35% by weight.

At the disperser outlet, water from the papermaking machine is now used for dilution. The product treated in this manner is then transferred via a standpipe 16 and the MC pump into a stacker 17, consisting of a stacking tower and a vat, where the treated product remains for a period of 120 to 240 minutes at a temperature of 60° C. to 80° C. [140° F. to 176° F.], preferably 70° C. to 80° C. [158° F. to 176° F.], and at a pulp consistency of 8% to 16%, preferably 10% to 14%, and subsequently for an additional period of 10 to 30 minutes at a temperature of 40° C. to 45° C. [104° F. to 113° F.] in a mixing vat located down-stream. This residence of the product at an elevated temperature is referred to as the temperature-controlled treatment.

Then the product thus treated leaves the mixing vat as so-called recycled pulp 18 and is subsequently further processed in a generally known manner into recycled base tissue 25 and in a likewise generally known manner into recycled tissue paper products for the final use 27.

Beside this main product line, pre-sorting waste 19 is generated in stages 2, 4 and 5 and this is removed from the process. Moreover, in stages 8, 10, 11 and 12, additional undesired by-products are formed that are collected in a vat, here a slurry vat 22, and discharged out of the process via the wastewater treatment installation 23.

In the process according to the invention, the old-paper starting material is placed onto a conveyor belt in bales or in loose form and loosened up by a bale breaker, for example, configured as rotating screws and additional conveyor belts, for example, the weighing belt, and subsequently conveyed to the next drum.

Here, the old-paper starting material first reaches the dissolving drum with a residual moisture of about 9% and is mixed with heated return water from the circulation cleaning system of the old-paper treatment. The water is at a temperature of 45° C. to 60° C. [113° F. to 140° F.]. Through rotation of the drum, paddle-like baffles on the drum walls lift up the old-paper mixture which is then defibrated by the impact energy. Additional baffles that prevent a rapid flow through the dissolving zone ensure a defined dissolving duration. In the second part of the drum, with the addition of dilution water, the so-called screen part, all pieces that are smaller than 7 mm are rinsed out through the drum perforation. Particles that cannot pass through this perforation due to their shape are removed from the process. In this process section, the work is normally done at temperatures of 20° C. to 70° C. [68° F. to 158° F.], preferably 50° C. to 60° C. [122° F. to 140° F.], with a residence time of 10 to 40 minutes, preferably at least 20 to 25 minutes. The pulp consistency in the dissolving section is normally 5% to 40%, preferably 15% to 20%, and the pulp consistency in the further screen section is 2% to 8%, preferably 3.5% to 4.5%. The pH value is usually set at 5 to 12, preferably 7 to 8.

Spores that are present are activated in the dissolving drum, that is to say, by raising the temperature to the indicated values, conditions are created that induce the germination process of the microbial spores and allow a subsequent, largely quantitative, washing out. In order to ensure these processes, the length of the dissolving drum was increased. Conventional dissolving drums have a residence time of 15 to 20 minutes. As a result of the lengthened version of the drum used in the process according to the invention, the dissolving time is prolonged to 20 or 25 minutes. As an alternative, a pulper or pulp dissolver can be used, as long as it guarantees the necessary residence time at the temperature needed to induce the germination.

Subsequently, the old-paper starting material reaches a vat or the dump chest that is equipped with an agitator so as to homogenize the pulp suspension and keep it in motion in order to prevent the settling of pulp, along with the formation of anaerobic zones and thus the growth or multiplication of anaerobic bacteria. Moreover, the activated spores are induced to enter a germination or sprouting phase. Process parameters typically employed for this purpose are temperatures of 20° C. to 70° C. [68° F. to 158° F.], preferably 30° C. to 50° C. [86° F. to 122° F.], especially 45° C. [113° F.]. The typical pulp consistency is 2% to 6%, preferably 3% to 4%. Appropriate residence times are 20 to 60 minutes, preferably 25 to 45 minutes. The pH value should lie between 6 and 8, preferably around the neutral range, depending on the types of microorganisms and microorganism spores present.

This is followed by a number of cleaning and sorting stages in which unwanted components such as particles that are specifically heavier than the fiber, printing ink particles, particles that are specifically lighter than the fiber, fine particles and fillers as well as flat and cubic particles are removed from the old-paper fiber material by means of a screen barrier with a typical mesh size of 1.0 to 2.4 mm and a typical slot width of 0.1 to 0.3 mm. These steps are normally referred to as pre-sorting, flotation, cleaning, fine-sorting, washing and deckering. The filtrate generated during the deckering is fed through a relief flotation stage into a super cell device where solids are separated from the water so that the water cleaned in this manner can be returned to the process. Typical process parameters used during these cleaning stages are temperatures ranging from 30° C. to 50° C. [86° F. to 122° F.], preferably 40° C. to 45° C. [104° F. to 113° F.]. The pulp consistency after the sorting is approximately 0.5% to 3%, preferably about 1% by weight, and the pulp consistency after the deckering rises to values ranging from 20% to 40%, preferably 35% by weight. Typical pulp passage times for these process stages lie in the range from 10 to 30 minutes, preferably about 20 minutes. The pH value of the reaction mixture is set at values of 5 to 10, preferably 6.5 to 8. While passing through the above-mentioned cleaning stages, the germinated and sprouting spores are especially sensitive to mechanical influences (shear stress). As a result, the cell walls can be destroyed and the bacteria can be destroyed. Aerophilic bacteria that are present can also attach themselves to the air bubbles formed in the flotation stage and are removed from the process together with the flotation foam. Over the course of the washing step, bacteria can also be rinsed out together with the washing water; the next time the circulation system is cleaned, they remain in the sediment or in the flotate, and will thus have been removed from the treatment process for old paper according to the invention.

After this cleaning, pressurized hot dispersion is carried out, whereby so-called dirt specks outside of the visibility range are ground up and residues of sticky impurities are deactivated; finally, the grinding process strengthens the fiber material. Typical process parameters of this pressurized hot dispersion are heating spiral temperatures ranging from 100° C. to 140° C. [212° F. to 284° F.], but preferably at least 110° C. to 130° C. [230° F. to 266° F.], with a typical residence time in the heating spiral of 2 to 8 minutes, but preferably about 7 minutes. The temperature between the grinding blocks should lie between 115° C. and 130° C. [239° F. and 266° F.], preferably about 121° C. [249.8° F.]. The mechanical intrinsic energy exerted on the pulp should be about 40 to 80 kWh/ton of air-dry pulp, preferably about 60 kWh/ton of air-dry pulp.

The pulp consistency lies in the range from 20% to 40% dry weight, but preferably at least 30% dry weight. The pressurized hot dispersion is preferably carried out in a device consisting of the heating spiral of the kind sold, for example, by the Andritz Sprout Bauer Company of Vienna, Austria under the designation "Sprout Bauer pressurized dispersion unit". In the above-mentioned pressurized hot dispersion, the high temperatures and the overpressure kill the remaining spores that have not already germinated as well as the already germinated spores or any microorganisms present or remaining in vegetative form.

This pressurized hot dispersion is followed by storage (under temperature-control) of the old-paper fibers which are now present in a pulp consistency of 5% to 15% by weight, preferably at about 10% by weight, at temperatures of 60° C. to 80° C. [140° F. to 176° F.], preferably in the range between 70° C. and 80° C. [158° F. and 176° F.], for an adequately long time, in order to kill off any intact vegetative bacteria that might still remain, that is to say, usually for a residence time of at least 100 minutes, preferably 2 to 4 hours, and especially about 3 hours.

The present invention will now be explained in greater detail with reference to embodiments. The surface colony count is determined in a manner similar to German standard DIN 54378, taking into account the special circumstances of tissue paper in that the number of colonies is determined that are found after an incubation time of 3 days at a temperature of 25° C. [77° F.], expressed in terms of a surface area of 100 cm$^2$ of the paper to be examined. DIN 54378 provides for a determination of the number of molds, but for the determination in the case of tissue paper, it can also be used in conjunction with other micro-organisms according to the list of abbreviations given below.

For this purpose, the prepared samples are placed onto Petri dishes on poured-out culture medium and covered with sterile, liquid culture medium and incubated. At the end of the incubation period, the colonies are counted and expressed in terms of a test surface area of 100 cm$^2$.

The following equipment was used for this purpose: an incubator that can be set at a temperature of 25° C. [77° F.]±1° C. [1.8° F.], a steam sterilizer for an operating pressure of up to about 3.5 bar, and a sterilization temperature up to 134° C. [273.2° F.]. This is set up in such a way that a temperature of 120° C. [248° F.]±2° C. [3.6° F.] can be maintained; the equipment used includes disposable Petri dishes with a diameter of 97 mm, scissors made of stainless steel, a template measuring 50 mm×50 mm, 2 pairs of tweezers, a Dispensette, a Bunsen burner, a clean-room workplace, a heatable magnetic agitator, a 500 ml laboratory bottle with a threaded neck as well as analytical scales.

The testing agents—in addition to freshly distilled water—were a casein peptone/soy meal peptone agar that is sold by the Merck Company under the designation Caso-Agar under Item No. 5458. A total of 40 grams of this agar is added per liter of water, this is heated to 25° C. [77° F.] and subsequently sterilized at 121° C. [249.8° F.] for 15 minutes. In order to prepare the samples, about 40 layers of the paper to be tested are cut out and subsequently taken to the clean-room workplace.

The actual test is performed in that, first of all, the Dispensette is sterilized at 121° C. [249.8° F.] for 15 minutes or else, in the case of serial analyses, it is sufficient to sterilize the tweezers and scissors as well as the templates by holding them over a flame. Then, at a temperature of 48° C. [118.4° F.]±2° C. [3.6° F.] and using a Dispensette, 10 ml of the sterile culture medium are poured into a Petri dish.

Immediately after that, a layer of the paper, which has already been cut into a square (5 cm×5 cm), is placed into the culture medium. After the culture medium solidifies again, another 10 ml are added. The ready Petri dishes are then placed into the incubator for 15 minutes with the cover facing downwards, which prevents condensation water from dripping onto the cultures. The subsequent incubation of the cultures takes place over the course of 3 days at 25° C. [77° F.]±1° C. [1.8° F.]. The evaluation is done after 3 days by counting the colonies that can be found on the top layer of the culture medium. The test report indicates the date of the sampling, the grade of the paper, the paper production and roll number as well as the surface colony count per 100 cm$^2$.

The total colony count is determined in a manner similar to German standard DIN 54379, and serves here to determine the total colony count on tissue paper and other substances. Moreover, this determination can also be used to check the efficacy of bactericidal and fungicidal additives.

The term total colony count refers to the number of cronies that are found after an incubation time of 3 days at a temperature of 25° C. [77° F.]±1° C. [1.8° F.], expressed in terms of 1 gram of the air-dry sample. For this purpose, the sample is placed into a sterile test tube and shaken 30 times with a Ringer solution. Part of the fiber material suspension is transferred to a Petri dish, mixed with nutrient agar and incubated. The number of colonies is determined at the end of the incubation time in the incubator. The arithmetic mean value from two determinations per sample is expressed in terms of 1 gram of air-dry sample and given as the total colony count.

As was the case for the determination of the surface colony count, the equipment used includes an incubator, a steam sterilizer, disposable Petri dishes, scissors, tweezers, a Dispensette, Bunsen burner, a clean-room workplace, a heatable magnetic agitator, laboratory bottles, analytical scales and, in addition, disposable measuring pipettes with a 0.1 ml graduation as well as disposable polyethylene tubes with a 12-mm plug closure.

The testing agents used are identical to those used for determining the surface colony count and, in addition, a Ringer solution of 8.5 g/l of sodium chloride (available from the Merck Company under Item No. 841) together with 1 g/l of peptone (available from the Merck Company, made from peptically digested meat, Item No. 7224). Subsequently, the solution is sterilized at 121° C. [249.8° F.] for 15 minutes.

Sample preparation and execution are done in such a way that square pieces having a side length of about 15 mm are cut from the sample pieces using sterile scissors. The samples must not be touched with the fingers. For each test, at least 2 samples of about 1.5 grams each have to be cut, 1.0 gram of the paper to be tested is weighed into a sterile test tube under sterile conditions. Then it is mixed with 10 ml of Ringer solution and shaken 30 times. When the sample is removed, it is necessary to ensure that any fibers that may have settled are completely swirled up with the sterile pipette used for the removal. The basic suspension thus obtained is the starting point of further dilutions. Since only 30 to 300 bacteria can be counted out on a plate with accuracy, the basic suspension has to be diluted in the case of higher germ counts, while the amount placed into the test tube has to be increased in case of lower germ counts. The actual test is carried out by sterilizing the tweezers, scissors and Dispensette for 15 minutes at 121° C. [249.8° F.]. Then 1 ml of the basic suspension is placed into a Petri dish and mixed with 10 ml of nutrient agar at a temperature of 48° C. [118.4° F.]±2° C. [3.6° F.]. In order to mix the nutrient agar uniformly with the basic suspension, the Petri dish is closed with the cover and carefully moved in a figure-eight, that is to say, not in a circular motion. The dishes are placed horizontally until the mixture has solidified. The filled Petri dishes are incubated for 3 days at 25° C. [77° F.]±1° C. [1.8° F.]. The plates have to be placed into the incubator in such a way that the cover is facing downwards.

The evaluation is done after 3 days by taking the samples out of the incubator, counting all of the colonies that are present and expressing these results as 1 gram of air-dry sample. In doing so, it is necessary to painstakingly make sure that fibers are not mistaken for colonies. The test report that is to be subsequently drawn up indicates the date of the sampling, the quality of the paper, the paper production and roll number as well as the total colony count, expressed in terms of 1 gram of air-dry material as well as the appertaining dilution factor.

The determination of the aerobic and anaerobic spore count is done by transferring 5 ml of a slurry into an empty test container and then left for 10 minutes in a water bath at 80° C. [176° F.]. This procedure brings about a growth activation of the bacteria spores, whereas all of the other vegetative cells die off.

This is followed by a ten-fold dilution series in which 1 ml of each dilution is transferred into a Petri dish. TGE agar is added to determine the aerobic spores and the agar plates are incubated anaerobically for 3 days at 30° C. [86° F.]. Reinforced Clostridia Agar (RCA) is used for the anaerobic spores and the agar plates are incubated anaerobically for 2 days at 37° C. [98.6° F.].

The old-paper treatment process according to the invention was studied with several different arrangements (Tests 1 through 6) within the spectrum of the critical process steps in order to ascertain its effectiveness in reducing the number of bacteria. In this context, Test 1 was carried out under the following production conditions: the temperature in the dispersion 15 was 110° C. to 112° C. [230° F. to 233.6° F.], the residence time in the heating spiral was 7 minutes at a temperature of 110° C. to 112° C. [230° F. to 233.6° F.], the level in the stacking tower 17 was 70% to 71%, thus resulting in a mean residence time of the pulp of 150 minutes at 75° C. [167° F.]±0° C. [0° F].

Test 2 was conducted at an elevated temperature (121° C. [249.8° F.]) in the dispersion 15, the residence time in the heating spiral was 7 minutes at a temperature of 121° C. [249.8° F.], the level in the stacking tower 17 was 47% to 58%, thus resulting in a mean residence time of the pulp of 120 minutes at 79° C. to 81° C. [174.2° F. to 177.8° F.].

Test 3 was carried out again at an elevated temperature (121° C. [249.8° F.]) in the dispersion 15, but the residence time in the heating spiral at a temperature of 121° C. [249.8° F.] was lowered from 7 minutes to 3.5 minutes, the level in the stacking tower 17 was 77% to 82%, thus resulting in a mean residence time of the pulp of 165 minutes at 78° C. to 81° C. [172.4° F. to 177.8° F.].

Test 4 was once again carried out at an elevated temperature (121° C. [249.8° F.]) in the dispersion 15, the residence time in the heating spiral was 7 minutes at a temperature of 121° C. [249.8° F.], the level in the stacking tower 17 was markedly lowered and was 33% to 39%, thus resulting in a mean residence time of the pulp of 90 minutes at 75° C. to 77° C. [167° F. to 170.6° F.].

In comparison to the standard, Test 5 employed a tower temperature (90° C. [194° F.]) in the dispersion 15, the residence time in the heating spiral was 6 minutes at a temperature of 90° C. [194° F.], the level in the stacking tower 17 was 59% to 68%, thus resulting in a mean residence time of the pulp of 135 minutes at 62° C. to 63° C. [143.6° F. to 145.4° F.].

In comparison to the standard, Test 6 once again employed a lower temperature (90° C. [194° F.]) in the dispersion 15, the residence time in the heating spiral was 6 minutes at a temperature of 90° C. [194° F.], the level in the stacking tower 17 was 69% to 85%, thus resulting in a mean residence time of the pulp of 150 minutes at 50° C. to 61° C. [122° F. to 141.8° F.].

The temperature in the dissolving aggregate, namely, the Ahlström drum 2, was set at a constant temperature of 50° C. [122° F.] for all of the tests T1 through T6. If the temperature falls below this value, the result is non-synchronous and incomplete germination. This is based on the current knowledge on this subject.

Furthermore, as described in the process according to the invention, biocides were not used.

During the test runs, aseptic samples were taken at staggered time intervals downstream from the dissolving aggregate 2, upstream from the dispersion 15, downstream from the stacking tower 17 and from the finished final product, and these samples were examined according to DIN 54379—Determination of the total germ count in paper, paperboard and cardboard—for their germ counts of aerobic bacteria, spores of aerobic bacteria, spores of anaerobic bacterial, fungi and yeast.

In all of the tests, the number of colony-forming units for anaerobic spores and for yeast was less than 10 in the pulp and less than 100 in the finished paper, that is to say, below the detection limit for the determination according to DIN 54379.

The further results of these tests are compiled in Tables 1 through 6. For a better understanding of the tables, it should be pointed out that, according to the above-mentioned standard, germ counts of less than 10 per gram or milliliter of pulp or less than 100 per gram of finished product are no longer detected. This means that no colonies of microorganisms were visible on the cultured plates.

The abbreviations used in Tables 1 trough 6 have the meanings given below:

| | |
|---|---|
| A. spp. | Aspergillus spp. |
| B. c. | Bacillus cereus var. |
| B. ci. | Bacillus circulans |
| B. l. | Bacillus licheniformis |
| B. m. | Bacillus megaterium |
| B. p. | Bacillus pumilis |
| B. s | Bacillus subtilis |
| B. sp. | Bacillus sphaericus |
| E. spp. | Enterobacterium spp. |
| G. spp. | Geotichium spp. |
| M. spp. | Mucor spp. |
| Ma. spp. | Mariannea spp. |
| N. spp. | Neurospora spp. |
| S. spp. | Sphingomonas spp. |
| P. spp. | Penicillium spp. |
| T. spp. | Trichoderma spp. |
| n.d. | not determined |
| CFU | colony-forming units = number of germs |
| T1 through T6 | Tests 1 through 6 |

TABLE 1

Content of aerobic bacteria in CFU/g (total colony count) during Tests T1 through T6

Aerobic bacterial (CFU per ml or g) Test No. and type of organisms

| Sampling site | T1 | type | T2 | type | T3 | type | T4 | type | T5 | type | T6 | type |
|---|---|---|---|---|---|---|---|---|---|---|---|---|
| After dissolving aggregate | $6 \cdot 10^6$ $11.5 \cdot 10^1$ | S. spp. B. s. | $21.5 \cdot 10^6$ $5 \cdot 10^3$ | S. spp. B. sp. | $22.5 \cdot 10^6$ | S. spp. | $5 \cdot 10^6$ | S. spp. | $5.2 \cdot 10^6$ | S. spp. | $5.5 \cdot 10^6$ $5 \cdot 10^3$ $1 \cdot 10^2$ | S. spp. B. s. B. c. |
| After double-screen press (=before pressure dispersion) | $11.5 \cdot 10^6$ $1.3 \cdot 10^2$ | S. spp. B. s. | $31.5 \cdot 10^6$ | S. spp. | $35 \cdot 10^6$ | S. spp. | $4.5 \cdot 10^6$ $1 \cdot 10^2$ | S. spp. E. spp. | $60 \cdot 10^6$ | S. spp. | $6.8 \cdot 10^6$ | Sp. spp. E. spp. |
| After the disperser | $1.5 \cdot 10^4$ | S. spp. | $3 \cdot 10^4$ | S. spp. | $8 \cdot 10^3$ | S. spp. | $3.5 \cdot 10^4$ | S. spp. | $3 \cdot 10^5$ | S. spp. | $5 \cdot 10^4$ $5 \cdot 10^2$ 30 | S. spp. B. s. B. sp. |
| After the stacking tower | $1.2 \cdot 10^4$ | S. spp. | $1 \cdot 10^4$ | S. spp. | $2.5 \cdot 10^2$ | S. spp. | $4 \cdot 10^2$ | B. sp. | $2.1 \cdot 10^6$ | S. spp. | $2.5 \cdot 10^3$ 40 20 | S. spp. B. sp. B. c. |
| In the paper | <100 | n.d. | <100 | n.d. | <100 | n.d. | $5 \cdot 10^2$ | B. sp. B. s. | $2.1 \cdot 10^4$ | B. sp. B. s. B. l. | $2 \cdot 10^4$ | B. sp. B.s. B. ci. |

TABLE 2

Content of aerobic bacterial spores in CFU/g (total colony count) during Tests T1 through T6

Aerobic bacterial spores (CFU per ml or g) Test no. and type of organisms

| Sampling site | T1 | type | T2 | type | T3 | type | T4 | type | T5 | type | T6 | type |
|---|---|---|---|---|---|---|---|---|---|---|---|---|
| After dissolving aggregate | $4 \cdot 10^3$ | B. s. | $7 \cdot 10^2$ | B. s. B. c. | $8 \cdot 10^2$ | B. s. B. l. | $2.5 \cdot 10^2$ | B. s. B. c. | $3.5 \cdot 10^2$ | B. l. B. s. | $2.3 \cdot 10^2$ | B. s. |
| After double-screen press (=before pressure dispersion) | $2.5 \cdot 10^3$ | B. s. | $3 \cdot 10^2$ | B. s. B. l. | $8 \cdot 10^2$ | B. s. B. c. | $1.4 \cdot 10^2$ | B. s. B. c. | $3.5 \cdot 10^2$ | B. s. B. sp. | $1 \cdot 10^2$ | B. s. B. p. B. sp. |
| After the disperser | <10 | n.d. | <10 | n.d. | <10 | n.d. | <10 | n.d. | $6.5 \cdot 10^2$ | B. s. B. sp. | $3 \cdot 10^2$ | B. s. B. p. |
| After the stacking tower | <10 | n.d. | <10 | n.d. | <10 | n.d. | <10 | n.d. | $9.5 \cdot 10^2$ | B. s. B. sp. B. l. B. c. | $7.5 \cdot 10^2$ | B. s. B. p. B. sp. B. m. |
| In the paper | <100 | n.d. | <100 | n.d. | <100 | n.d. | <100 | n.d. | $7 \cdot 10^2$ | B. s. B. sp. | $2.6 \cdot 10^3$ | B. sp. B. m. B. l. |

TABLE 3

Content of fungi in CFU/g (total colony count) during Tests T1 through T6

Fungi (CFU per ml or g) Test no. and type of organisms

| Sampling site | T1 | type | T2 | type | T3 | type | T4 | type | T5 | type | T6 | type |
|---|---|---|---|---|---|---|---|---|---|---|---|---|
| After dissolving aggregate | $1.3 \cdot 10^3$ | A. spp. G. spp. M. spp. P. spp. T. spp. | $2 \cdot 10^3$ | G. spp. M. spp. P. spp. T. spp. | $3.5 \cdot 10^3$ | G. spp. M. spp. P. spp. | $10.5 \cdot 10^2$ | A. spp. M. spp. Ma. spp. P. spp. T. spp. | $8 \cdot 10^2$ | G. spp. N. spp. P. spp. | $2.5 \cdot 10^3$ | A. spp. G. spp. M. spp. Ma. spp. P. spp. T. spp. |
| After double-screen press (=before pressure dispersion) | $3 \cdot 10^2$ | A. spp. G. spp. M. spp. P. spp. T. spp. | $2 \cdot 10^3$ | G. spp. M. spp. P. spp. T. spp. | $6.5 \cdot 10^3$ | G. spp. M. spp. P. spp. | $6 \cdot 10^2$ | A. spp. M. spp. P. spp. | $1.6 \cdot 10^3$ | A. spp. G. spp. M. spp. P. spp. T. spp. | $1.35 \cdot 10^3$ | A. spp. G. spp. M. spp. Ma. Spp. N. spp. P. spp. T. spp. |
| After the disperser | <10 | n.d. | <10 | n.d. | <10 | n.d. | <10 | n.d. | <10 | n.d. | <10 | n.d. |

TABLE 3-continued

Content of fungi in CFU/g (total colony count) during Tests T1 through T6

Fungi (CFU per ml or g) Test no. and type of organisms

| Sampling site | T1 | type | T2 | type | T3 | type | T4 | type | T5 | type | T6 | type |
|---|---|---|---|---|---|---|---|---|---|---|---|---|
| After the stacking tower | <10 | n.d. | <10 | n.d. | <10 | n.d. | <10 | n.d. | <10 | n.d. | <10 | n.d. |
| In the paper | <100 | n.d. | <100 | n.d. | <100 | n.d. | <100 | n.d. | <100 | n.d. | <100 | n.d. |

TABLE 4.1

CFU reduction of aerobic bacteria during Tests T1 through T6

Aerobic bacteria Test no. and CFU reduction

| Sampling site | CFU reduction T1 (%) | CFU reduction T2 (%) | CFU reduction T3 (%) | CFU reduction T4 (%) | CFU reduction T5 (%) | CFU reduction T6 (%) |
|---|---|---|---|---|---|---|
| After double-screen press (=before pressure dispersion) | 0 | 0 | 0 | 0 | 0 | 0 |
| After the disperser | 99.8695 | 99.9047 | 99.9771 | 99.2222 | 99.50 | 99.2569 |
| After the stacking tower | 99.9895 | 99.9683 | 99.9993 | 99.9911 | 96.50 | 99.9623 |
| In the paper | 99.9991 (b) | 99.9997 (b) | 99.9997 (b) | 99.9888 | 99.965 | 99.4118 |

(a) assumed operand: 9 CFU
(b) assumed operand: 99 CFU

TABLE 4.2

CFU reduction of aerobic bacterial spores during Tests T1 through T6

Aerobic spores Test no. and CFU reduction

| Sampling site | CFU reduction T1 (%) | CFU reduction T2 (%) | CFU reduction T3 (%) | CFU reduction T4 (%) | CFU reduction T5 (%) | CFU reduction T6 (%) |
|---|---|---|---|---|---|---|
| After the dissolving aggregate | 0 | 0 | 0 | 0 | 0 | 0 |
| After double-screen press (=before pressure dispersion) | 37.5 | 57.143 | 0 | 0 | 0 | 0 |
| After the disperser | 99.795 (a) | 98.714 (a) | 98.075 (a) | 44.0 (a) | −85.71 (*) | −30.43 (*) |
| After the stacking tower | 99.795 (a) | 98.714 (a) | 98.75 (a) | 44.0 (a) | −171.43 (*) | −226.08 (*) |
| In the paper | 97.525 (b) | 85.857 (b) | 87.625 (b) | 60.4 (b) | −100 (*) | 1030.435 (*) |

(a) assumed operand: 9 CFU
(b) assumed operand: 99 CFU
(*) a minus sign means growth instead of reduction

TABLE 4.3

CFU reduction of fungi during Tests T1 through T6

Fungi Test no. and CFU reduction

| Sampling site | CFU reduction T1 (%) | CFU reduction T2 (%) | CFU reduction T3 (%) | CFU reduction T4 (%) | CFU reduction T5 (%) | CFU reduction T6 (%) |
|---|---|---|---|---|---|---|
| After the dissolving aggregate | 0 | 0 | 0 | 0 | 0 | 0 |
| After double-screen press (=before pressure dispersion) | 76.923 | 85.0 | −85.714 (*) | −474.26 (*) | −100.0 (*) | 46.0 |

TABLE 4.3-continued

CFU reduction of fungi during Tests T1 through T6

| Sampling site | CFU reduction T1 (%) | CFU reduction T2 (%) | CFU reduction T3 (%) | CFU reduction T4 (%) | CFU reduction T5 (%) | CFU reduction T6 (%) |
|---|---|---|---|---|---|---|
| After the disperser (a) | 99.308 | 99.55 | 99.743 | 91.43 | 98.875 | 99.64 |
| After the stacking tower (a) | 99.308 | 99.55 | 99.743 | 91.43 | 98.875 | 99.64 |
| In the paper (b) | 92.385 | 95.05 | 97.171 | 5.714 | 87.625 | 96.04 |

(a) assumed operand: 9 CFU
(b) assumed operand: 99 CFU
(*) a minus sign means growth instead of reduction The following Table 5 provides an overview of the values for the surface and total germ counts for the above-mentioned recycled tissue obtained in the Tests T1 through T6.

TABLE 5

Surface germ count and total germ count of the recycled base tissue

| | Surface germ count | Total germ count |
|---|---|---|
| T1 | 0.8 | 220 |
| T2 | 1.3 | 860 |
| T3 | 2.5 | 890 |
| T4 | 8.57 | 5100 |
| T5 | 43 | 16,600 |
| T6 | 38 | 17,070 |

Figure 2:
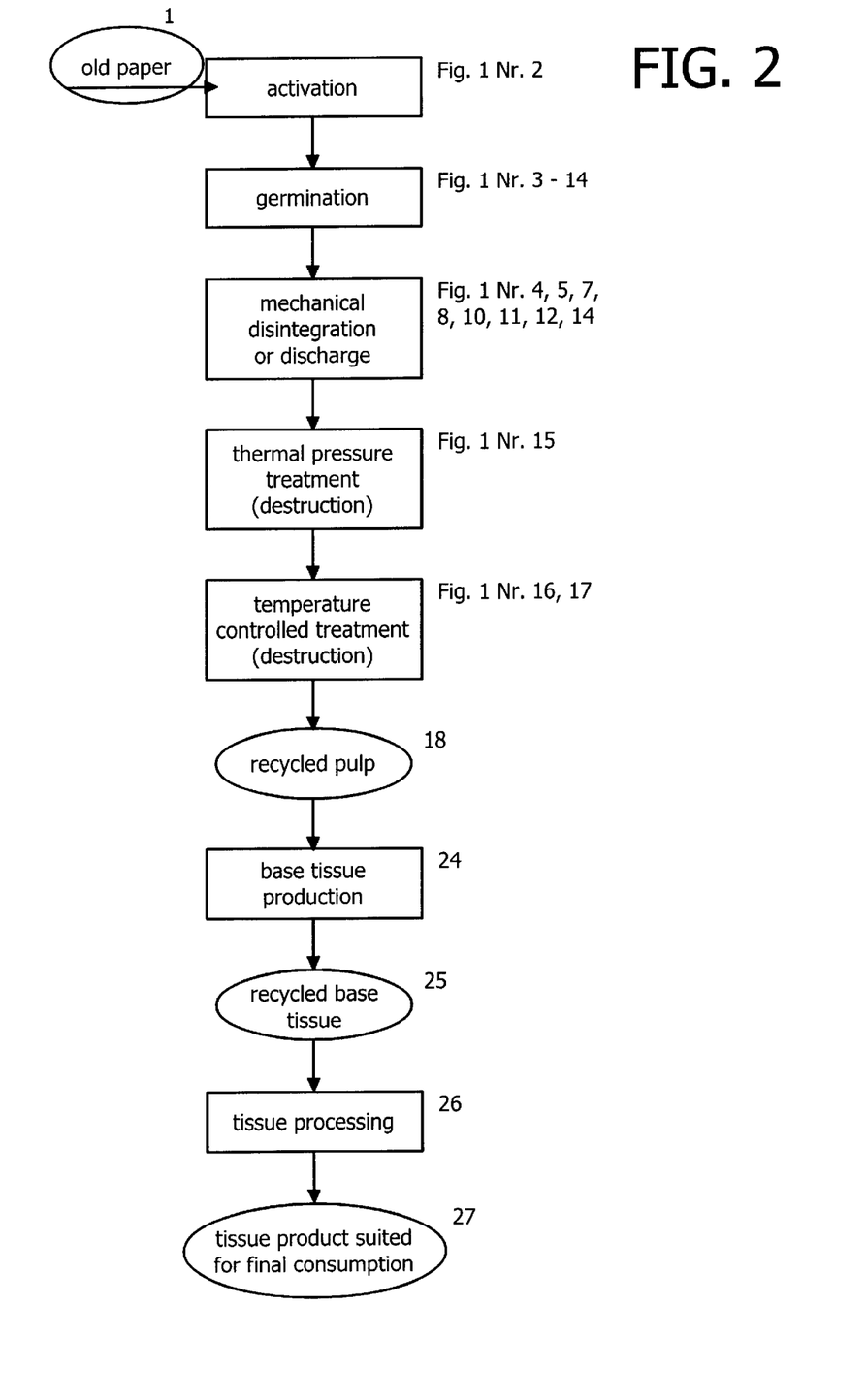
FIG. 2 shows the essential process steps of the invention.

In a dissolving drum made by the Ahlström Company, the dispersion was carried out employing the following technical characteristic data and process parameters in the process according to the invention described above in FIG. 1 or FIG. 2 during Tests 1 through 6, using an old-paper starting material 1 consisting of mixtures having the grades as described above in the process according to the invention. The dissolving temperature was 50° C. [122° F.], the pulp consistency in the dissolving section was 14% to 16%, the pulp consistency in the screen section was 3.5% to 4.5% and the passage time was 20 to 25 minutes.

The next drum vat, made by the Ahlström Company, had the following parameters: a temperature of 50° C. [122° F.], a pulp consistency of 3.5% to 4.5% and a pH value in the neutral range. The residence time was 5 minutes.

In the subsequent old-paper dump chest 3, the temperature was 45° C. to 50° C. [113° F. to 122° F.], and the residence time was 33 minutes.

The subsequent cleaning stages, which were described above, made use of thick stock cleaners 4 (made by the Voith/Sulzer Company) and this was followed by a three-stage pre-sorting unit 5 (made by the Voith/Sulzer Company) with a maximum throughput quantity of 670 oven-dry tons per 24 hours, followed by deflakers 7 (made by the Voith/Sulzer Company) with a maximum throughput quantity of 800 oven-dry tons per 24 hours, followed by a two-stage flotation unit 8 consisting of 6+2 cells (made by the Voith/Sulzer Company) with a maximum throughput quantity of 357 oven-dry tons per 24 hours—followed by a four-stage cleaner 10 (made by the Voith/Sulzer Company) with a maximum throughput quantity of 415 oven-dry tons per 24 hours, followed by a three-stage slot sorting unit 11 (made by the Voith/Sulzer Company) with a maximum throughput quantity of 311 oven-dry tons per 24 hours, followed by a washing stage that is in a disk save-all unit 12 (made by the MFA Company) with a maximum throughput quantity of 125 oven-dry tons per 24 hours and a washer 12 (made by the Voith/Sulzer Company), with a maximum throughput quantity of 215 oven-dry tons per 24 hours followed by a screen belt press (made by the MFA Company) that functions as a deckering device, whereby the process parameters used were a temperature of 45° C. [113° F.], a pulp consistency after the sorting of about 1%, a pulp consistency after the deckering of about 33%, at a neutral pH range and a pulp passage time totaling 20 minutes.

The pressure dispersion unit 15, made of up two elements, consists of a heating spiral (made by the Sprout Company) and a connected disperser (made by the Sprout Company), whereby the following process parameters are used: a temperature in the heating spiral of at least 110° C. to 130° C. [230° F. to 266° F.], a residence time in the heating spiral of 7 minutes, a temperature between the grinding plates of 121° C. [249.8° F.], a mechanical intrinsic energy exerted on the pulp of about 60 kWh/ton of air-dry pulp, a pulp consistency of at least 30% dry weight at an overpressure of 0.5 to 0.7 bar and a steam consumption of approximately 0.5 tons of steam per ton of oven-dry pulp.

In the last step, the so-called stacking tower 17, which has a volume of about 400 m$^3$, the product fed in is kept at temperatures of about 80° C. [176° F.] at a pulp consistency of 10% for at least 2 hours. The product made in this manner (recycled pulp) 18 was made into a spore-free recycled base tissue with a substance of 18 to 20.2 g/m$^2$. This recycled base tissue 25 was then analyzed for the total germ count, surface germ count, number of aerobic bacteria, spores of aerobic bacteria, spores of anaerobic bacteria, fungi and yeast.

What is claimed is:

1. A process for the treatment of waste paper starting material containing spores of sporulating microorganisms, without the use of biocides, chlorine compounds, hydrogen peroxide, and peracetic acid, comprising the following process steps:

treating the waste paper starting material in an environment containing water in order to activate the microorganism spores, germinating the spores, further processing the waste paper starting material containing germinated spores in at least one separation stage at temperatures above room temperature (20° C. to 70° C. (68° F. to 158° F.)), hot dispersing the further processed waste paper starting material in a water vapor atmosphere at a pressure greater than atmospheric pressure, subjecting the dispersed material to a temperature-controlled treatment, and processing into a largely spore-free recycled pulp, from that into a largely spore-free base tissue with a total germ count of less than 1000 CFU/g and a surface germ count of less than 20 CFU/dm$^2$.

2. The process according to claim 1, wherein the microorganism spores are activated by a treatment selected from the group consisting of: a thermal treatment, a light wave treatment, an enzymatic treatment or an appropriate chemical treatment.

3. The process according to claim 1, wherein a waste paper starting material dispersed in water is used as the environment containing water for the waste paper starting material.

4. The process according to claim 1, wherein the germination of the microorganism spores is carried out over a period of time of 60 to 120 minutes at temperatures ranging from 20° C. to 90° C. (68° F. to 194° F.).

5. The process according to claim 4, wherein the germination of the microorganism spores is carried out over a period of time of 70 to 100 minutes.

6. The process according to claim 4, wherein the germination of the microorganism spores is carried out at temperatures ranging from 50° C. to 80° C.

7. The process according to claim 1, wherein the dispersing is carried out in a water vapor atmosphere at a pressure of 0.1 to 4 bar above atmospheric pressure.

8. The process according to claim 7, wherein the dispersing is carried out in a water vapor atmosphere at a pressure of 1.2 to 1.6 bar.

9. The process according to claim 1, wherein the dispersing treatment is carried out as a dispersion at temperatures of 100° C. to 140° C. (212° F. to 284° F.) for a period of time sufficient to achieve sterilization.

10. The process according to claim 9, wherein the dispersing treatment is carried out at temperatures of 100° C. to 130° C.

11. The process according to claim 10, wherein the dispersing treatment is carried out at a temperature of about 121° C.

12. The process according to claim 1, wherein the temperature-controlled treatment is carried out for a period of time of 120 to 240 minutes.

13. The process according to claim 12, wherein the temperature-controlled treatment is carried out at 50° C. to 90° C. (122° F. to 194° F.) and at a pulp consistency of 5% to 16% by weight.

14. The process according to claim 13, wherein the temperature-controlled treatment is carried out at 60° C. to 85° C.

15. The process according to claim 13, wherein the temperature-controlled treatment is carried out at a pulp consistency of 10% to 14% by weight.

16. The process according to claim 12, wherein the temperature-controlled treatment is carried out for 150 to 180 minutes.

17. The process according to claim 1, wherein the sporulating microorganisms are germ cells of algae, fungi and/or bacteria.

18. The process according to claim 1, wherein waste paper selected from low-grade, medium-grade, high-grade paper, or kraft paper is used as the waste paper starting material.

19. The process according to claim 1, wherein the base tissue paper is further processed into tissue rolled products or tissue folded products intended for consumption.

20. The process according to claim 1, wherein the waste paper starting material is pre-sorted.

21. The process according to claim 1, wherein the waste paper starting material is pre-shredded.

22. The process according to claim 1, wherein the separation stage comprises a process selected from the group consisting of: pre-sorting, flotation, fine-sorting, washing and deckering while returning the resulting separated and de-pulped clear water to be part of the environment containing water.

* * * * *